(12) United States Patent
Caspers et al.

(10) Patent No.: US 11,982,766 B2
(45) Date of Patent: May 14, 2024

(54) LIDAR DEVICE USING MULTIPLE POLARIZATIONS

(71) Applicant: Robert Bosch GmbH, Stuttgart (DE)

(72) Inventors: Jan Niklas Caspers, Stuttgart (DE); Simon Schneider, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 584 days.

(21) Appl. No.: 17/185,215

(22) Filed: Feb. 25, 2021

(65) Prior Publication Data
US 2021/0278508 A1 Sep. 9, 2021

(30) Foreign Application Priority Data
Mar. 5, 2020 (DE) .................. 102020202819.2

(51) Int. Cl.
| | | |
|---|---|---|
| G01S 7/481 | (2006.01) |
| G01S 7/4911 | (2020.01) |
| G01S 7/499 | (2006.01) |
| G02B 27/28 | (2006.01) |
| G02F 1/29 | (2006.01) |
| G02F 1/31 | (2006.01) |

(52) U.S. Cl.
CPC ............ *G01S 7/4817* (2013.01); *G01S 7/481* (2013.01); *G01S 7/4911* (2013.01); *G01S 7/499* (2013.01); *G02B 27/286* (2013.01); *G02F 1/292* (2013.01); *G02F 1/31* (2013.01); *G02F 2203/07* (2013.01); *G02F 2203/24* (2013.01)

(58) Field of Classification Search
CPC ...... G01S 7/4817; G01S 7/481; G01S 7/4911; G01S 7/499; G02B 27/286; G02F 1/292; G02F 1/31; G02F 2203/07; G02F 2203/24
See application file for complete search history.

(56) References Cited

U.S. PATENT DOCUMENTS

| | | | | |
|---|---|---|---|---|
| 4,832,431 A * | 5/1989 | Nolting | ................. | G02F 1/0136 385/2 |
| 5,206,698 A * | 4/1993 | Werner | ................... | G01S 17/95 356/342 |
| 5,724,165 A * | 3/1998 | Wu | ........................... | G02F 1/31 398/55 |
| 9,647,426 B1 * | 5/2017 | Fish | ...................... | H01S 5/5009 |
| 2007/0132993 A1 * | 6/2007 | Shibata | ............. | G02B 6/29358 356/328 |
| 2011/0141471 A1 * | 6/2011 | Schlotterbeck | ........... | G01P 5/26 356/342 |
| 2012/0286136 A1 * | 11/2012 | Krill | ..................... | G01S 7/4817 250/206 |
| 2015/0346340 A1 * | 12/2015 | Yaacobi | .................. | G01S 7/499 356/5.11 |

(Continued)

*Primary Examiner* — Jonathan M Hansen
(74) *Attorney, Agent, or Firm* — NORTON ROSE FULBRIGHT US LLP; Gerard A. Messina

(57) ABSTRACT

A lidar device having an integrated optics that has a beam deflecting unit having an optical phase array that has a multiplicity of antennas that are set up to emit electromagnetic radiation at a prespecified angle of radiation. The angle of radiation covers a prespecified field of view of the lidar device. The angle of radiation has a first angle of radiation subregion, in which electromagnetic radiation is emitted having a polarization A, and has a second angle of radiation subregion, in which electromagnetic radiation is emitted having a polarization B.

12 Claims, 3 Drawing Sheets

(56) References Cited

U.S. PATENT DOCUMENTS

| | | | |
|---|---|---|---|
| 2015/0378241 A1* | 12/2015 | Eldada | G02F 1/292 |
| | | | 359/299 |
| 2017/0082907 A1* | 3/2017 | Park | G02F 1/292 |
| 2018/0024374 A1* | 1/2018 | Sugimoto | G02B 5/04 |
| | | | 359/238 |
| 2018/0175501 A1* | 6/2018 | Byun | G02F 1/292 |
| 2018/0267250 A1* | 9/2018 | Hosseini | G01S 17/42 |
| 2020/0050094 A1* | 2/2020 | Han | G03B 21/142 |
| 2020/0124711 A1* | 4/2020 | Rezk | G01S 7/4818 |
| 2020/0150241 A1* | 5/2020 | Byrnes | G02B 6/122 |
| 2020/0225332 A1 | 7/2020 | Wagner et al. | |
| 2021/0063541 A1* | 3/2021 | Zheng | G01S 7/4817 |
| 2021/0190925 A1* | 6/2021 | Asghari | G01S 7/499 |

* cited by examiner

LIDAR DEVICE USING MULTIPLE POLARIZATIONS

CROSS REFERENCE

The present application claims the benefit under 35 U.S.C. § 119 of German Patent Application No. DE 102020202819.2 filed on Mar. 5, 2020, which is expressly incorporated herein by reference in its entirety.

FIELD

The present invention relates to a lidar device having an integrated optical system that has a beam deflecting unit having an optical phase array that has a multiplicity of antennas that are set up to emit electromagnetic radiation at a prespecified angle of radiation, the angle of radiation coinciding with a prespecified field of view of the lidar device.

BACKGROUND INFORMATION

Miniaturized optical systems are the subject matter of numerous current investigations in the field of microsystems technology. In this context, in particular so-called integrated optics provides a possibility for conducting and processing electromagnetic radiation (light) in very compact planar waveguides. The physical basis for the conducting of electromagnetic radiation here is analogous to that of conventional fiber optics cables. The lidar device has a beam deflecting unit having an optical phase array. This can be used as a substitute for conventional mechanical mirrors. It is substantially more resistant to mechanical shocks, and can also potentially be manufactured at lower cost. It can also be realized substantially more compactly.

Such a lidar device can use the emitted electromagnetic radiation to measure the shape of objects and their distance, and is used in particular for automated driving. In the automotive field, a typical requirement of such a lidar device is a field of view of 60°×20°. The deflection of the electromagnetic radiation here standardly takes place via the wavelength of the light. This is based on the Bragg effect of the antennas used in the beam deflecting unit. The antennas are realized as grating couplers. Here, the angle of radiation that is achieved is a function of the grating period of the grating coupler, of the average effective index of refraction in the grating region, of the optical vacuum wavelength of the electromagnetic radiation, and of the diffraction order. The grating coupler typically operates in the first diffraction order, because this has the greatest intensity. In this way it can be determined which wavelength region is required in order to cover a given field of view. A typical material for the grating coupler is silicon. A coverage of a range of 20° in such a silicon-based system, having a start angle of radiation of 10° and an end angle of radiation of 30°, requires that the lidar device be tunable through a wavelength range of more than 200 nm. Such tunability through wavelength ranges is however not capable of being achieved at present. The requirement on the wavelength tunability can indeed be reduced to approximately 180 nm, in a range of angle of radiation between 50° and 70°. However, in this range the angle of radiation also reduces the effective aperture of the optical phase array by 50%, and thus increases beam divergence. This reduces the range of the lidar device.

SUMMARY

According to an example embodiment of the present invention, a lidar device is provided in which the angle of radiation has a first angle of radiation subregion, in which electromagnetic radiation is emitted with a polarization A, and has a second angle of radiation subregion, in which electromagnetic radiation is emitted with a polarization B.

The lidar device according to an example embodiment of the present invention may have the advantage that the high requirements on an angle of radiation of 20° can be achieved. For this purpose, the optical phase array is designed in such a way that, in a first angle of radiation subregion, electromagnetic radiation is emitted having a polarization A, and in a second angle of radiation subregion electromagnetic radiation is emitted having a polarization B. Here, the optical phase array can for example be designed such that the polarization A covers a first angle of radiation subregion 0°-10°, and the polarization B covers a second angle of radiation subregion 10°-20°. In this way, given correct design of the optical phase array, it is possible to reduce the required spectral bandwidth to one-half its previous size, because each polarization only has to cover one angle of radiation subregion. The two polarizations thus cover adjacent angle of radiation subregions in the same wavelength region.

It is also possible for the polarization A, preferably realized as transversally electric, and the polarization B, preferably realized as transversally magnetic, to be realized orthogonal to one another. The angle of radiation of the antennas is determined by, inter alia, the optical vacuum wavelength of the electromagnetic radiation and the effective index of refraction. The effective index of refraction now differs, for the orthogonal polarizations that are used, in a specified waveguide of the optical phase array. This difference in the effective index of refraction can be used to reduce the spectral bandwidth. The required spectral bandwidth for covering a 20° field of view is calculated by performing a check of which wavelength region is required to cover each of two adjacent 10° regions (first and second angle of radiation subregions), and whether these wavelength regions are identical.

In a particular specific embodiment of the present invention, it is provided that the first angle of radiation subregion and the second angle of radiation subregion are made disjoint to one another.

The first angle of radiation subregion is connected to the second angle of radiation subregion. There results an optimal coverage of the two angle of radiation subregions.

In accordance with an example embodiment of the present invention, it is also advantageous that an end angle of radiation of the first angle of radiation subregion agrees with a starting angle of radiation of the second angle of radiation subregion.

The end angle of radiation of the first angle of radiation subregion here agrees with the starting angle of radiation of the second angle of radiation subregion. This means that it is possible, using the same optical grating structures as antennas, to cover an angular region of 20° by using the two polarizations of the electromagnetic radiation, while using only an effectively halved wavelength region. The spectral wavelength tunability of the optical phase array is halved in comparison with the solution of the related art having only one polarization. From the condition that the end angle of radiation of the first angle of radiation subregion must agree with the starting angle of radiation of the second angle of radiation subregion, the requirements that exist on the effective index of refraction can be derived. The following holds:

$$n_{e\!f\!f}^{TM} - n_{e\!f\!f}^{TE} = (M/\Lambda)*(\lambda_{End}^{TM} - \lambda_{Start}^{TE}).$$

Here, $n_{eff}^{TM}$, $n_{eff}^{TE}$ are the effective indices of refraction for transversal magnetic (TM) and transversal electric (TE) polarization; $\lambda_{End}^{TM}$, $\lambda_{Start}^{TE}$ are the end and start wavelengths of the electromagnetic radiation having transversal magnetic and transversal electric polarization; m is the diffraction order, and $\Lambda$ is the grating period. The required spectral bandwidth ($\lambda_{End}^{TM}-\Lambda_{Start}^{TE}$) is thus proportional to the difference in the effective indices of refraction $n_{eff}^{TM}-n_{eff}^{TE}$. This means that when the difference in the indices of refraction becomes greater, the required spectral region also becomes larger. In other words, larger angle of radiation regions can now be covered. Given smaller required angle of radiation regions, the difference in the effective indices of refraction has to be reduced. In the optical gratings of the antennas that are used, 0.1°/nm is standardly possible. For an angle of radiation range of 10°, 100 nm of spectral bandwidth is thus required. From the factor m/$\Lambda$ ~500 nm$^{-1}$, it now follows that a difference of exactly ~0.2 between the effective indices of refraction is required. This is precisely the difference for which the waveguides can be designed in this example.

Alternatively, in accordance with an example embodiment of the present invention, it is advantageously provided that the beam deflecting unit has at least one polarization rotating unit that is set up to divide the electromagnetic radiation, preferably in equally distributed fashion, into the electromagnetic radiation having polarization A and the electromagnetic radiation having polarization B, or is set up to switch between electromagnetic radiation having polarization A and electromagnetic radiation having polarization B.

Polarization A and polarization B can be controlled in the optical phase array by a polarization rotation unit. On the one hand, this can be designed so that it always divides the electromagnetic radiation in 50:50 fashion into the polarization A and the polarization B. The advantage of such a division is that a plurality of angles of radiation can be regarded the same time, i.e. a parallelization takes place. On the other hand, alternatively it can be designed such that it switches back and forth between the polarization A and the polarization B. This helps to maintain unambiguousness.

In addition, it is advantageous that the polarization rotation unit is connected before the optical phase array, or that a respective polarization rotation unit is connected between a phase shifter of the optical phase array and an associated antenna.

The polarization rotation unit can thus be inserted either before each antenna or before the optical phase array as a whole. The advantage of placing the polarization rotation unit before the optical phase array is that only one component is required. However, it then has to be ensured that the division of the electromagnetic radiation and the phase shifters function independently of the polarization. Alternatively, the polarization rotation unit can also respectively be placed after the phase shifter and before the antenna associated therewith. In this case, correspondingly more polarization rotation units are required. However, the components used can then be optimized for a polarization.

According to a preferred specific embodiment of the present invention, it is provided that the polarization rotation unit has two channels for electromagnetic radiation that are combined in a polarization multiplexer, a polarization-rotating element, preferably a polarization mode converter, being situated in one of the two channels.

The polarization rotation unit can be realized in various ways. In particular, here integrated optical solutions are to be preferred. This is given for example via the two channels, a polarization-rotating element being inserted into one of these channels. The polarization-rotating element can be realized for example as a polarization mode converter. The electromagnetic radiation in the two channels is subsequently combined in a polarization multiplexer and is forwarded to subsequent elements. The electromagnetic radiation that runs through the channel having the polarization-radiating element is rotated in its polarization; the electromagnetic radiation running through the other channel remains unmodified.

In accordance with an example embodiment of the present invention, it may be advantageous that an optical switch, preferably realized as a Mach-Zehnder interferometer, is connected before the two channels; the switch is electrically controllable and switches between the two channels. The optical switch switches between the two channels. It can be realized for example as a Mach-Zehnder interferometer. The optical switch is electrically controllable and controls through which of the two channels the electromagnetic radiation propagates. The optical switch can be made up of couplers and electrically controllable phase shifters.

Advantageous developments of the present invention are disclosed herein.

BRIEF DESCRIPTION OF THE DRAWINGS

Exemplary embodiments of the present invention are explained in more detail on the basis of the figures and the description below.

DETAILED DESCRIPTION OF EXAMPLE EMBODIMENTS

Figure 1:
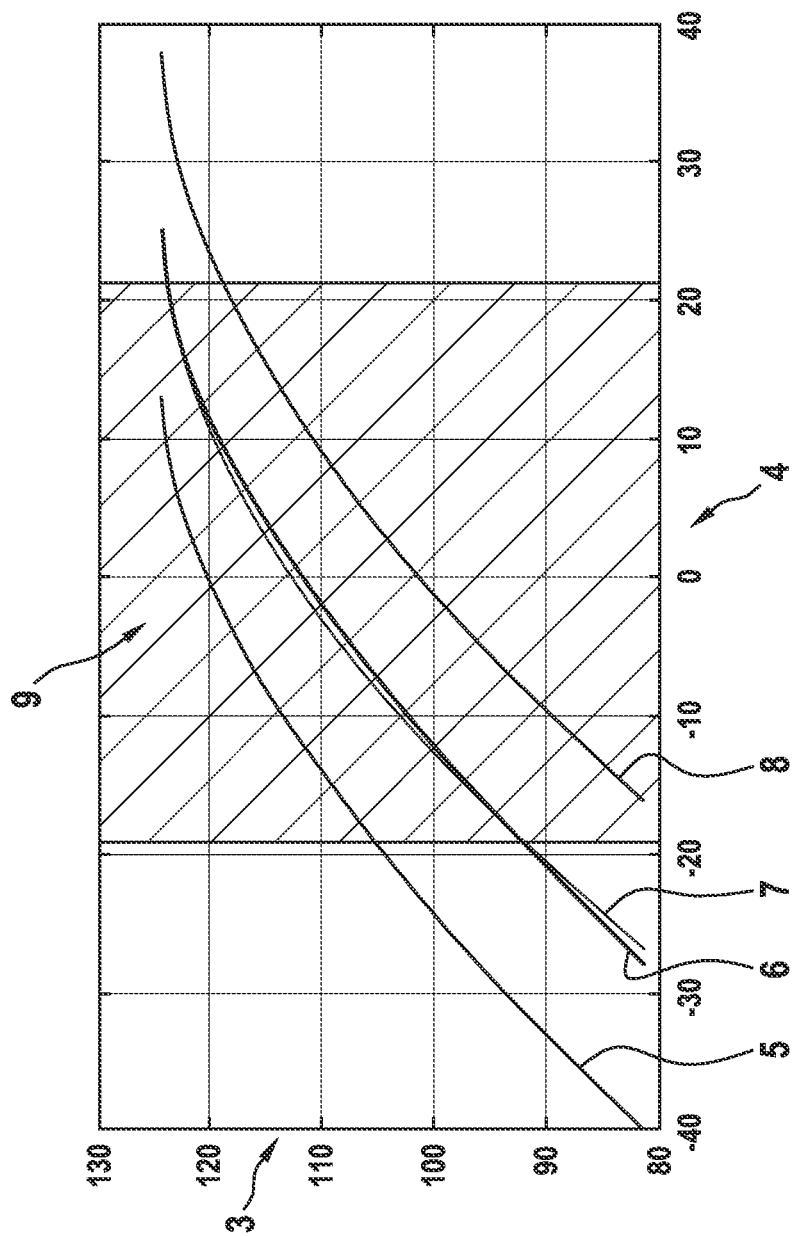
FIG. 1 shows an example of a functional dependence of an effective bandwidth difference on an angle of radiation of the lidar device, in accordance with the present invention.

In conventional lidar devices of the related art, it can be ascertained which wavelength region of an emitted electromagnetic radiation is required in order to cover a prespecified field of view. As an example, this will be illustrated on the basis of a vertical field of view of 20°. This is typically required in automotive applications. The deflecting of the electromagnetic radiation is standardly done via the wavelength of the electromagnetic radiation. This is based on the Bragg effect of a grating coupling of the conventional lidar device. The relationship of dependence of the angle of radiation can then be calculated as follows:

$$\sin \theta = n_{eff} - m^*\lambda_0/\Lambda.$$

Here $\Lambda$ is the grating period, $n_{eff}$ is the average effective index of refraction in the grating region; $\lambda_0$ is the optical vacuum wavelength, and $\theta$ is the angle of radiation to the normal of the grating, at which emission takes place. The factor m indicates the diffraction order. Preferably, Bragg grating couplers operate in the first diffraction order (m=1), because this has the greatest intensity. For a given system, it can now be calculated which wavelength region is required to cover a given field of view of a lidar device. This is carried out on the basis of the named vertical field of view of 20°. Here, a grating coupler made of silicon is assumed, having an effective index of refraction of 2.7. A positive radiated angle region above 0° is assumed. A radiation at the normal causes back-reflections in the grating that are to be avoided. It turns out that in a radiated angle region of 20°, having a starting angle of radiation of 10° and an end angle of radiation of 30°, a wavelength tunability of the lidar device of greater than 200 nm has to be provided. However, this is currently not technically realizable. It is true that the requirements on the wavelength tunability can be reduced to approximately 180 nm. However, this assumes a radiated angle region of 50° to 70°. The effective aperture of an optical phase array of the lidar device would be reduced by 50% here, thus increasing the beam divergence. This reduces the range of the lidar device.

In a lidar device according to the present invention, these disadvantages are overcome. In order to meet the high demands of a 20° radiated angle region, the radiated angle region is divided into a first radiated angle subregion and a second radiated angle subregion. The two radiated angle subregions are made disjoint. The first radiated angle subregion has electromagnetic radiation having a polarization A; in the example of the specific embodiments, this is realized as a transversal electric polarization. The second radiated angle subregion has electromagnetic radiation having a polarization B; in the example of the specific embodiments, this is realized as a transversal magnetic polarization. The two polarizations are thus designed to be orthogonal. An optical phase array 1 of the lighter device than has to be designed such that it for example covers the radiated angle subregion of 0° to 10° with transversal electrically polarized electromagnetic radiation, and covers the radiated angle subregion of 10° to 20° with transversal magnetically polarized electromagnetic radiation. If the design is correct, it is then possible to reduce the required spectral bandwidth to half of its conventionally used size, because each polarization only has to cover one radiated angle subregion. The two polarizations used thus have to cover adjacent radiated angle subregions, for the same wavelength region 3.

Angle of radiation 4 in antennas 2 that are used in optical phase array 1 is determined by, inter alia, the optical vacuum wavelength $\lambda_0$ and the effective index of refraction $n_{eff}$. This effective index of refraction $n_{eff}$ is different in a waveguide of optical phase array 1 for transversal electrically polarized electromagnetic radiation and transversal magnetically polarized electromagnetic radiation. The required spectral bandwidth for covering a 20° radiated angle region is now calculated by checking whether wavelength region 3 is required to cover each of two adjacent 10° radiated angle subregions, and whether these wavelength regions 3 are identical.

Therefore, in FIG. 1 the required wavelength region 3 (in nm) is now plotted on the y axis over the angle of radiation 4 (in °) on the x axis. Shown are starting angle of radiation 5 of the transversal magnetically polarized electromagnetic radiation, end angle of radiation 6 of the transversal magnetically polarized electromagnetic radiation, start angle of radiation 7 of the transversal electrically polarized electromagnetic radiation, and end angle of radiation 8 of the transversal electrically polarized electromagnetic radiation. It can be seen that there is a preferred radiated angle region 9 of from −18° to +21°, in which the two radiated angle subregions for the different polarizations connect to one another. End angle of radiation 6 is thus lower than start angle of radiation 7. That is, it is possible, using the same optical grating structures as antennas 2, by using the two orthogonal polarizations of the electromagnetic radiation, to cover a radiated angle region of 20° while using only one wavelength region 3 of less than 100 nm. In this way, in conventional lidar devices there results a halving of the required spectral wavelength tunability.

End angle of radiation 6 here has to agree with start angle of radiation 7. From this condition, in general it can be derived what requirements on the effective index of refraction exist in order to realize the present invention. The following holds:

$$n_{eff}^{TM} - n_{eff}^{TE} = (m/\Lambda)*(\lambda_{End}^{TM} - \lambda_{Start}^{TE}).$$

Here $n_{eff}^{TM}$, $n_{eff}^{TE}$ are the effective indices of refraction for transversal magnetic and transversal electric polarization at the associated wavelength; $\lambda_{End}^{TM}$, $\lambda_{Start}^{TE}$ are the end and start wavelengths of the electromagnetic radiation with transversal magnetic and transversal electric polarization; m is the diffraction order, and $\Lambda$ is the grating period. The required spectral bandwidth ($\lambda_{End}^{TM} - \lambda_{Start}^{TE}$) is thus proportional to the difference in the effective indices of refraction $n_{eff}^{TM} - n_{eff}^{TE}$. This means that when the difference in the indices of refraction becomes greater, the required spectral region also becomes larger. In other words, larger angle of radiation regions can now be covered. Given smaller required angle of radiation regions, the difference in the effective indices of refraction has to be reduced. In the optical gratings of the antennas 2 that are used, 0.1°/nm is standardly possible. For an angle of radiation region of 10°, 100 nm of spectral bandwidth is thus required. From the factor m/$\Lambda$ ~500 nm$^{-1}$, it now follows that a difference of exactly ~0.2 between the effective indices of refraction is required. This is precisely the difference for which the waveguides can be designed in this example.

Figure 2:
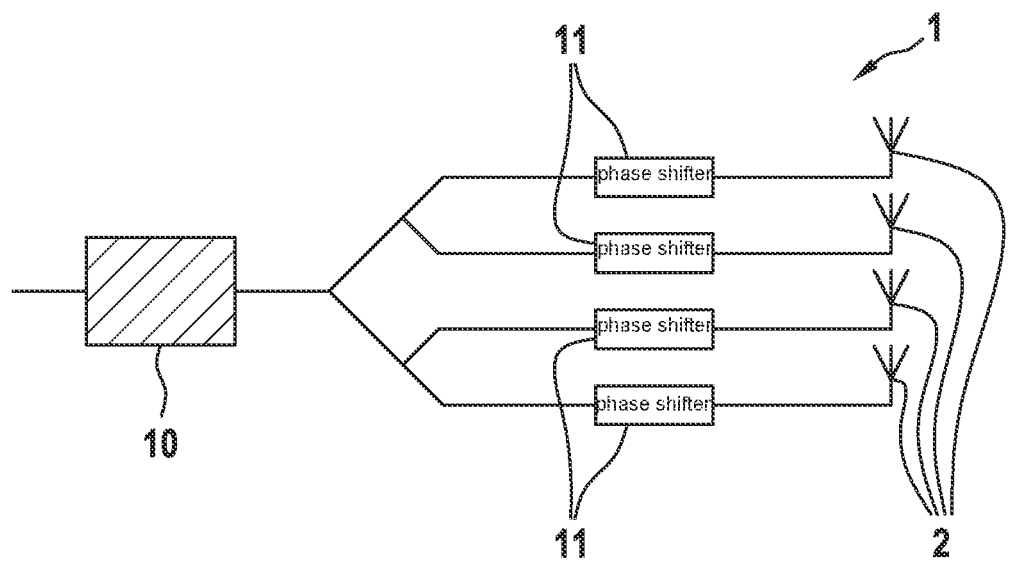
FIG. 2 shows an exemplary specific embodiment of a beam deflecting unit having a polarization rotating unit situated before an optical phase array, in accordance with the present invention.
Figure 3:
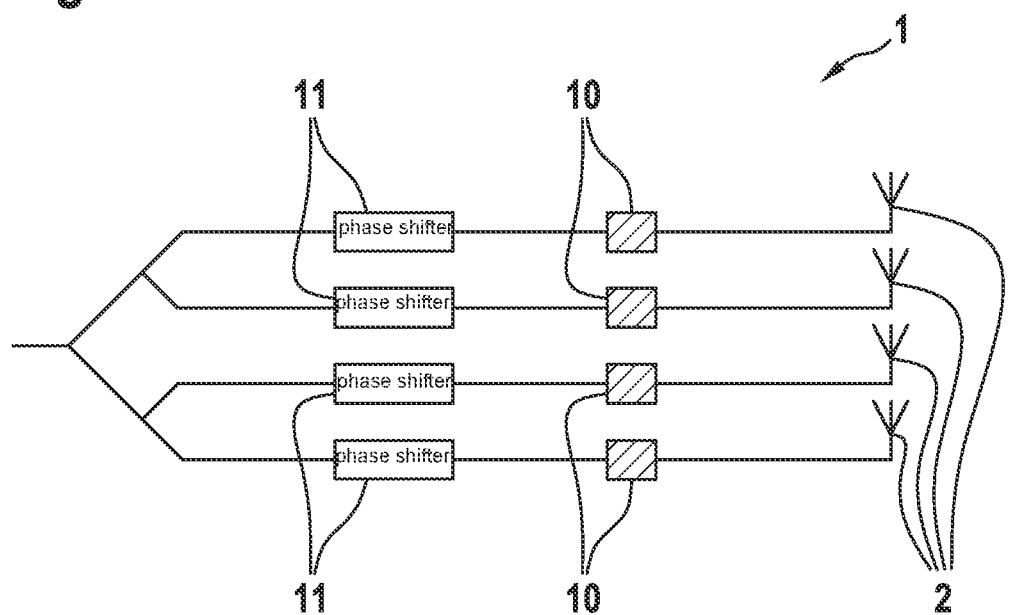
FIG. 3 shows an alternative exemplary specific embodiment of the beam deflecting unit having a respective polarization rotating unit between a phase shifter and an antenna of the optical phase array, in accordance with the present invention.

FIGS. 2 and 3 now show how it is possible to control the two polarizations in optical phase array 1. For this purpose, a polarization rotation unit 10 is used. On the one hand, this can be designed so that it always divides the electromagnetic radiation 50:50 into the two polarizations. Alternatively, polarization rotating unit 10 can switch between the polarizations. In the first case, it is advantageous that a plurality of angles of radiation can be regarded at the same time, i.e., a parallelization takes place. In the second case, the switching between the polarizations helps to maintain unambiguousness. Polarization rotation unit 10 can be connected before optical phase array 1, as shown in FIG. 2. Here it is advantageous that only one component is required. The division of the electromagnetic radiation and the phase shifters 11 then must function independently of the polarization. Alternatively, as shown in FIG. 3, polarization rotation unit 10 can respectively be placed between an antenna 2 and a phase shifter 11. It is true that significantly more polarization rotation units 10 are then required, but the named components can then be optimized for the polarization.

Figure 4:
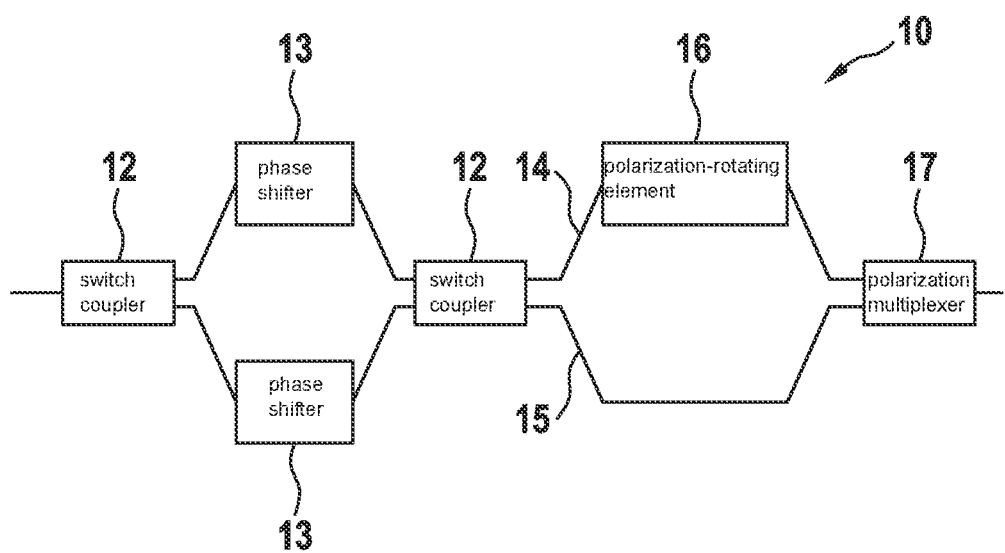
FIG. 4 shows an exemplary specific embodiment of the polarization rotating unit, in accordance with the present invention.

Polarization rotation unit 10 can be realized in different ways. An exemplary specific embodiment is shown in FIG. 4. The depicted polarization rotation unit 10 is made controllable. It includes a switch that is constructed from switch couplers 12 and switch phase shifters 13. The switch switches between a first channel 14 and a second channel 15. In first channel 14 there is situated a polarization-rotating element 16 that, as an example, can be realized as a polarization mode converter. The electromagnetic radiation of first channel 14 and of second channel 15 is combined in a polarization multiplexer 17. In this case, the switch is made electrically controllable. It controls through which of the channels 14, 15 the electromagnetic radiation propagates. If the radiation is conducted through the first channel 14 there is a rotation of the polarization; if it is conducted through second channel 15 the original polarization is maintained.

Although the present invention has been illustrated and described in detail on the basis of preferred exemplary embodiments, the present invention is not limited by the disclosed examples, and other variations can be derived therefrom by the person skilled in the art without departing from the scope of the present invention.

What is claimed is:

1. A lidar device, comprising:
   an integrated optics that includes a beam deflecting unit having an optical phase array having a multiplicity of antennas, each respective antenna of the multiplicity of antennas being set up to emit electromagnetic radiation at a prespecified angle of radiation, the prespecified angle of radiation covering a prespecified field of view of the lidar device;
   wherein the prespecified angle of radiation is divided, using a polarization rotation unit situated upstream of the respective antenna, into two subregions which are adjacent to one another and together cover the prespecified field of view of the lidar device, the two subregions including a first angle of radiation subregion, in which the electromagnetic radiation is emitted having a first polarization, and a second angle of radiation subregion, in which the electromagnetic radiation is emitted having a second polarization, which is different from the first polarization.

2. The lidar device as recited in claim 1, wherein the first polarization is transversally electric, and the second polarization is transversally magnetic, the first polarization and the second polarization being orthogonal to one another.

3. The lidar device as recited in claim 1, wherein the first angle of radiation subregion and the second angle of radiation subregion do not overlap with one another.

4. The lidar device as recited in claim 3, wherein the first angle of radiation subregion and the second angle of radiation subregion are adjacent to one another such that an end angle of radiation of the first angle of radiation subregion is immediately adjacent to a starting angle of radiation of the second angle of radiation subregion.

5. The lidar device as recited in claim 1, wherein the beam deflecting unit includes at least one polarization rotating unit that is set up to divide the electromagnetic radiation in equally distributed fashion into electromagnetic radiation having the first polarization and electromagnetic radiation having the second polarization, or is set up to switch between the electromagnetic radiation having the first polarization and the electromagnetic radiation having the second polarization.

6. The lidar device as recited in claim 5, wherein the beam deflecting unit includes at least one polarization rotating unit that is set up to divide the electromagnetic radiation in equally distributed fashion into the electromagnetic radiation having the first polarization and the electromagnetic radiation having the second polarization.

7. The lidar device as recited in claim 5, wherein the polarization rotating unit is connected before the optical phase array, or wherein a respective polarization rotation unit is connected between a phase shifter of the optical phase array and an associated antenna.

8. The lidar device as recited in claim 5, wherein the polarization rotating unit has two channels for electromagnetic radiation that are combined in a polarization multiplexer, a polarization-rotating element being situated in one of the two channels.

9. The lidar device as recited in claim 8, wherein the polarization-rotating element is a polarization mode converter.

10. The lidar device as recited in claim 8, wherein an optical switch is connected before the two channels, the switch being electrically controllable and switching between the two channels.

11. The lidar device as recited in claim 1, wherein the prespecified angle of radiation is 20°, the first subregion covering 0° through 10° of the prespecified angle of radiation, and the second subregion covering 10° through 20° of the prespecified angle of radiation.

12. The lidar device as recited in claim 1, wherein the polarization rotation unit includes a polarization multiplexer which combines, upstream of the respective antenna, the electromagnetic radiation emitted having the first polarization, and the electromagnetic radiation emitted having the second polarization.

* * * * *